(No Model.) 2 Sheets—Sheet 1.
F. W. WILDER.
SAUSAGE STUFFER.
No. 408,945. Patented Aug. 13, 1889.
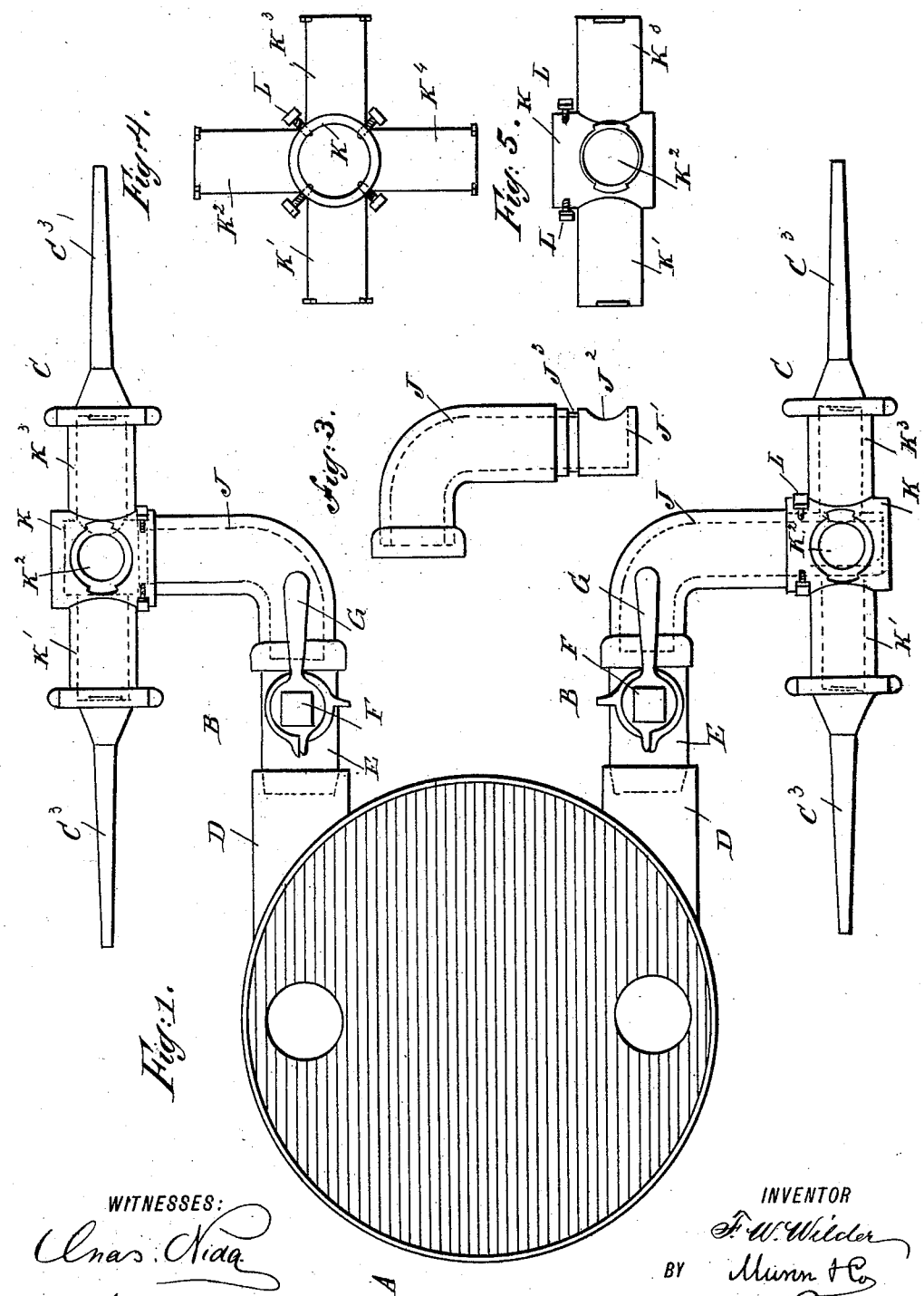
WITNESSES:
INVENTOR
F. W. Wilder
BY Munn & Co.
ATTORNEY

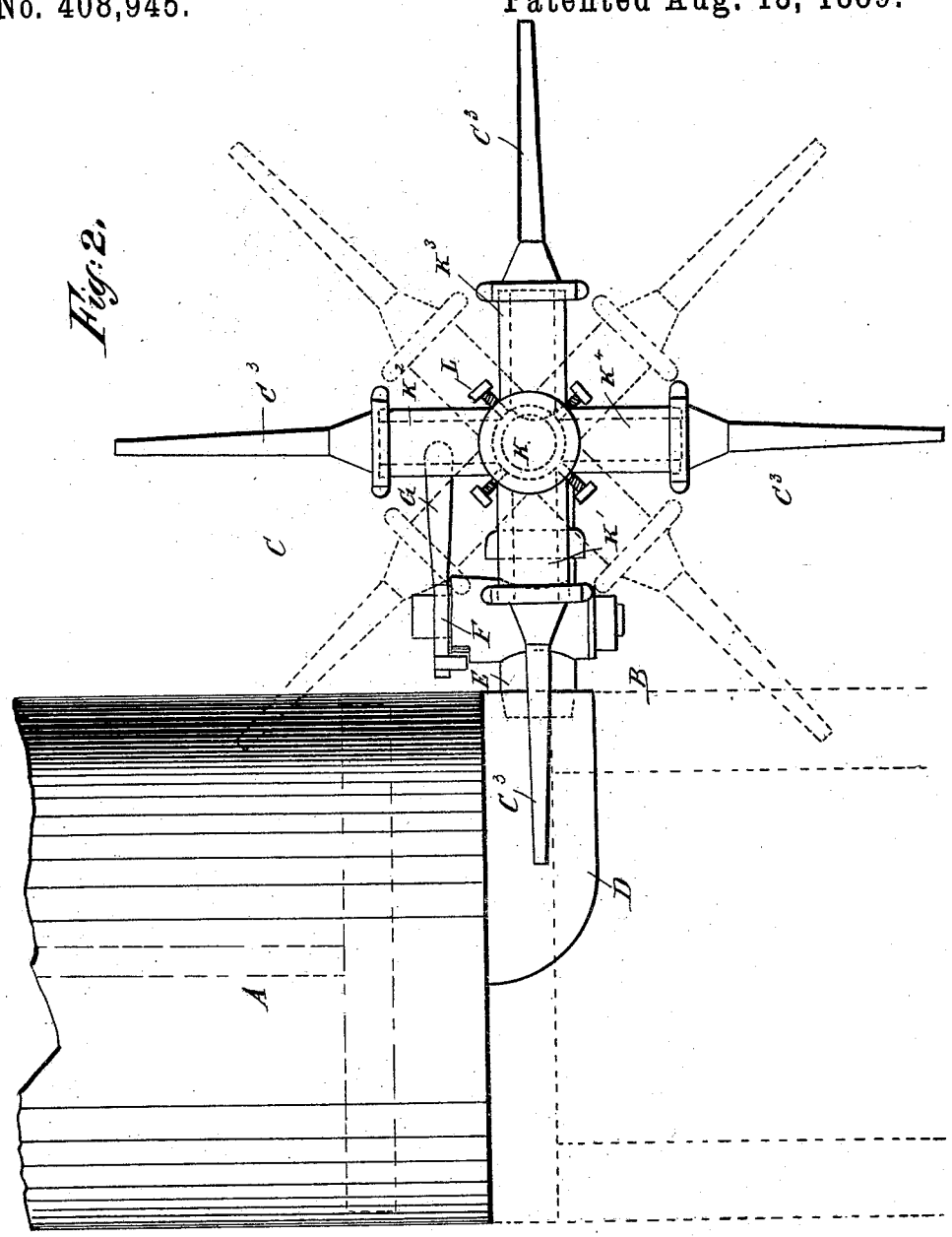

UNITED STATES PATENT OFFICE.

FREDERICK W. WILDER, OF CHICAGO, ILLINOIS.

SAUSAGE-STUFFER.

SPECIFICATION forming part of Letters Patent No. 408,945, dated August 13, 1889.

Application filed January 28, 1889. Serial No. 297,818. (No model.)

*To all whom it may concern:*

Be it known that I, FREDERICK W. WILDER, of Chicago, in the county of Cook and State of Illinois, have invented a new and Improved Sausage-Stuffer, of which the following is a full, clear, and exact description.

The object of the invention is to provide a new and improved sausage-stuffer, which is simple and durable in construction, very effective and continuous in operation, and permits a rapid exchange of the nozzles carrying the casings to be filled without stopping the machine.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a side elevation of the same. Fig. 3 is a plan view of a nozzle-elbow of modified form. Fig. 4 is a side elevation of the nozzle-cross, and Fig. 5 is a plan view of the same.

The vessel A of suitable shape and dimensions contains the meat to be filled into the usual sausage-casings, and is provided with an operating-piston. (Shown in dotted lines, Fig. 1.) From the bottom of the vessel A lead one or more outlet-pipes B, each supporting on its outer end a nozzle C, on which a casing to be filled is placed. The outlet-pipe B comprises a pipe D, secured to the bottom of the vessel and opening therein. Two such pipes are generally used, and to the outer ends thereof short pipes E are secured, each having a valve F of any approved construction, provided with a handle G. Suitable stops are formed on the valves and pipes for limiting the movement of the handle G.

I provide each section E of the outlet-pipe B with an elbow J, having its outer end J' closed and slightly reduced, and provided with a side opening J², as is plainly shown in Fig. 3. Onto this reduced end J' fits a collar K, provided with a number of hollow arms K', K², K³, and K⁴, extending radially from the collar and opening into the same. The inner openings of the hollow arms K', K², K³, and K⁴ are adapted to register alternately with the said opening J² in the reduced end of the elbow J. The nozzle C comprises the cross formed of the collar K and its radial arms, and a funnel C³, held on each of the latter. In order to hold the collar K of the cross on the reduced end J' of the elbow J, I provide the collar K with one or more screws L, which fit into an annular groove J³, formed in the reduced end J' of the said elbow J.

The device just described is used as follows: The vessel A may be provided with one or more outlet-pipes, two being shown in Fig. 1. When the nozzle is in the position shown in Fig. 2 and casings are applied on the funnels C³, if the operator opens the valve F the meat from the vessel A passes through the pipes D and E into the elbow J and to the reduced end of the same, from which it passes through the side opening J² into the hollow arm K³ of the cross. From the hollow arm K³ the meat passes into the funnel C³ and into the casing held on the said funnel. The meat presses into the casing and fills the same, and the moment the casing is filled the operator gives the nozzle C a quarter-turn, so that the hollow arm K³ is disconnected from the opening J², and the next following hollow arm K² connects with the side opening, so that the meat from the elbow J passes through the hollow arm K² into the funnel C³, supported on the said arm and into the casing held on the said funnel. As soon as the casing is filled, the nozzle is again given a quarter-turn, so as to bring the next following hollow arm K' to register with the opening J². The above-described operation is then continually repeated, and each funnel C³ is supplied with a new casing as soon as the casing on it is filled. It will be seen that with this arrangement the operator does not close the valve F at all, as the arms carrying the several funnels connect alternately with the side opening of the elbow J. When the operator desires to stop the machine, he closes the valve F by moving the handle G.

Having thus fully described my invention, I claim as new and desire to secure by Letters Patent—

1. An attachment for sausage-stuffing machines, consisting in a pipe having a lateral opening and an annular groove at its outer end, and a rotary nozzle-carrier formed of a central collar having screws projecting through it into said groove, and radial hollow arms or tubes registering with said lateral opening when the nozzle-carrier is rotated, substantially as set forth.

2. In a sausage-stuffer, the combination, with the outlet-pipe having a side opening, of a nozzle comprising a hollow cross mounted to turn on the said outlet-pipe, the arms of the said cross registering alternately with the said side opening, and a funnel held on each of the said cross-arms, substantially as shown and described.

3. A sausage-stuffing machine consisting in the cylinder A, provided with an outlet B, comprising a pipe D, secured to the bottom of the vessel, and a short pipe E, having a valve F, and the pipe J, connected with the outer end of the pipe F and provided at its outer end with a lateral opening and a rotary nozzle-carrier having a series of detachable nozzles $C^3$, substantially as set forth.

FREDERICK W. WILDER.

Witnesses:
EDMUND S. ELLIS,
ALLEN CATER.